United States Patent [19]  [11] 4,066,838
Fujita et al.  [45] Jan. 3, 1978

[54] APPARATUS FOR DETACHABLY MOUNTING ELECTRICAL ASSEMBLY UNITS TO SUPPORTING PANELS

[75] Inventors: Teizo Fujita, Ibaraki; Tosiro Ohashi, Ikeda, both of Japan

[73] Assignee: Izumi Denki Corporation, Osaka, Japan

[21] Appl. No.: 681,931

[22] Filed: Apr. 30, 1976

[51] Int. Cl.² .............................................. H02G 3/12
[52] U.S. Cl. .................................... 174/48; 174/53; 248/27.1
[58] Field of Search ................. 174/48, 58, 57, 53; 220/3.6, 3.7; 248/27.1, DIG. 6; 200/297, 296; 339/122 R, 125 R, 126 R, 45 R, 45 M, 45 T, 92 R, 92 M

[56] References Cited

U.S. PATENT DOCUMENTS

| | | | |
|---|---|---|---|
| 3,090,587 | 5/1963 | Peterson | 248/27.1 |
| 3,233,299 | 2/1966 | Godel | 248/27.1 X |
| 3,433,886 | 3/1969 | Myers | 220/3.7 |
| 3,590,137 | 6/1971 | Librandi | 174/58 |
| 3,829,599 | 8/1974 | Fujioka | 174/48 |
| 3,852,513 | 12/1974 | Flahive | 174/58 X |

Primary Examiner—J. V. Truhe
Assistant Examiner—D. A. Tone
Attorney, Agent, or Firm—Pollock, Vande Sande & Priddy

[57] ABSTRACT

An apparatus for detachably mounting an electrical assembly unit to a supporting frame comprises a rotatable threaded rod mounted on the supporting frame and extending in the direction along which the electrical unit is moved to be mounted or detached. Pressing means is mounted on the threaded rod movably in the axial direction thereof. Stop means is fixedly provided on the electrical unit in such position to be engaged by the pressing means. By rotating the threaded rod in one direction, the stop means is forcefully engaged with the pressing means, whereby the electrical unit is moved to the tightly clamped position. The rotation of the threaded rod in the other direction causes the movement of the pressing means in the opposite direction, whereby the stop and hence the electrical assembly unit are moved to the removed or detached position under the pressing force of the engaged pressing means.

12 Claims, 15 Drawing Figures

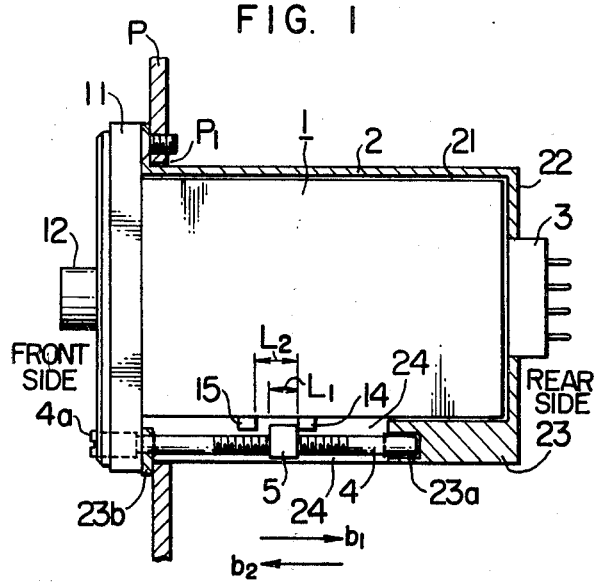
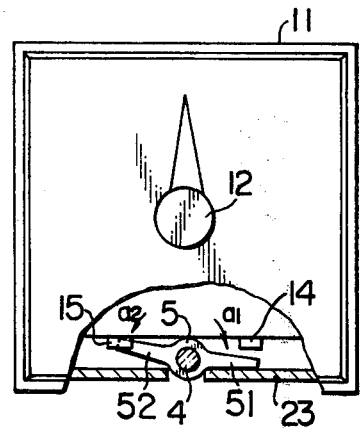
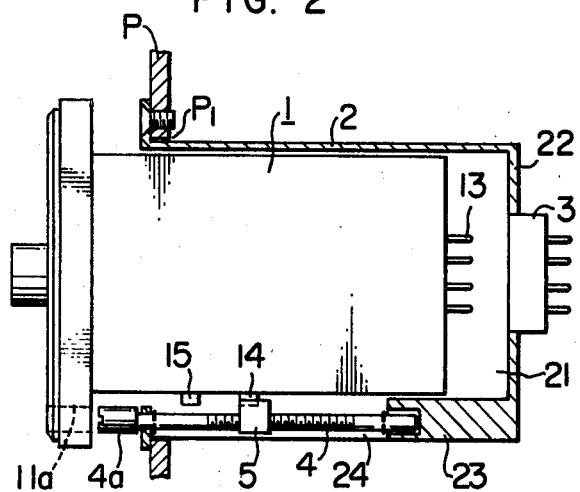
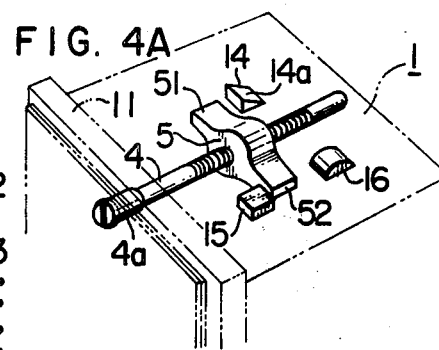
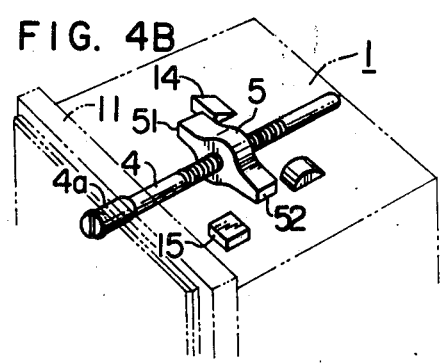

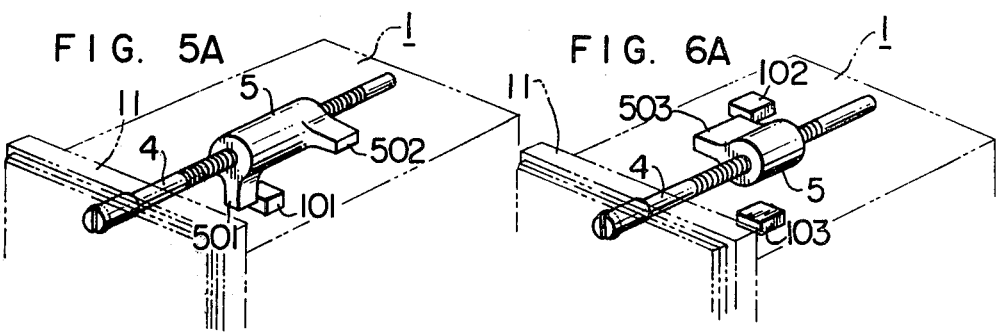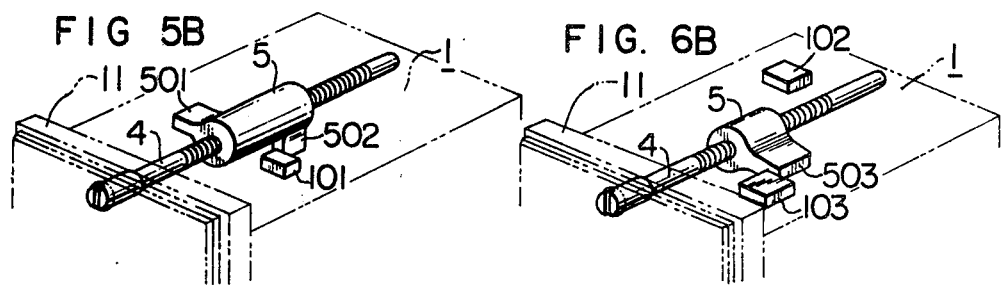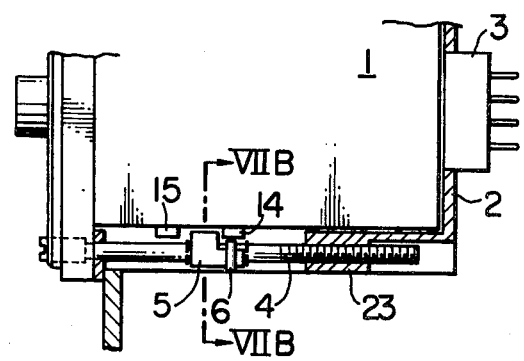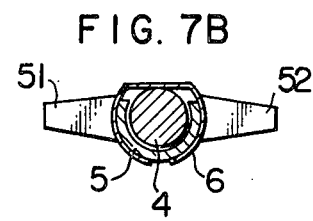

4,066,838

APPARATUS FOR DETACHABLY MOUNTING ELECTRICAL ASSEMBLY UNITS TO SUPPORTING PANELS

BACKGROUND OF THE INVENTION

1. Field of the Invention

The present invention relates to an apparatus for detachably mounting or clamping electrical assembly devices or instruments on a mounting frame such as a panel.

2. Description of the Prior Art

In general, when an electrical device or assembly unit is to be mounted on a mounting frame such as a panel, it is common that securing pieces or fittings provided on the electrical unit are forcefully bent at the rear side of the mounting panel and pressed against the rear surface thereof. Alternatively, a flange having mounting bolts anchored therein is provided for the electrical assembly unit to be mounted, whereby the latter is directly secured onto the panel by means of the bolts.

The hitherto known mounting methods as described above have often encountered difficulties particularly when the mounted electrical unit is to be detached from the mounting panel. This is especially so in the case where the unit has terminal pins to be received in a plug-in socket disposed at the mounting panel, because the terminals are usually fitted tightly in the receptacles of the socket, which provides a significant resistance to the detachment or removal of the unit. Such problem becomes more serious, when the manually gripped flange of the unit is relatively thin. With a view to eliminating the above difficulty, it is known to provide a special lever for the electrical assembly unit to facilitate the detachment thereof from the mounting panel. Or a suitable tool such as a screw driver is inserted between the flange of the mounted unit and the front surface of the panel to separate the electrical assembly unit from the latter. However, the provision of such special lever positioned usually in front of the mounting panel is undesirable from the spatial and the esthetic view points. On the other hand, the use of the separating tool such as the screw driver would possibly impair the electrical unit or the panel.

SUMMARY OF THE INVENTION

Accordingly, an object of the present invention is to provide an apparatus which allows a much facilitated mounting and removal of electrical assembly units to and from a mounting frame such as a panel in a simplified and reliable manner.

Another object of the invention is to provide the apparatus of the above type which requires substantially no modification or provision of special means on the part of the electrical assembly unit which may impair the esthetic appearance of the unit.

According to one aspect of the invention, there is provided an apparatus for detachably mounting an electrical assembly unit to a supporting frame, comprising a rotatable threaded rod mounted on the supporting frame and extending in the direction along which the electrical assembly unit is moved to be mounted or detached. Pressing means is mounted on the threaded rod movably in the axial direction thereof. Stop means is provided on the electrical assembly unit in such position to be engaged by the pressing means. By rotating the threaded rod in one direction, the stop means is forcefully engaged with the pressing means, whereby the electrical assembly unit is moved to the tightly mounted or clamped position. The rotation of the threaded rod in the other direction causes the movement of the pressing means in the opposite direction, whereby the stop and hence the electrical unit are moved to the removed or detached position under the pressing force of the engaged pressing means.

The above and other objects as well as various advantageous features of the invention will become more apparent by examining description of preferred embodiments of the invention taken in conjunction with the accompanying drawings.

BRIEF DESCRIPTION OF THE DRAWINGS

FIG. 1 shows in a vertical sectional view an embodiment of the apparatus according to the invention in a position in which an electrical assembly unit is mounted and clamped on a mounting panel.

FIG. 2 is a similar view to FIG. 1 to show the same in a position in which the electrical unit is being detached from the mounting frame.

FIG. 3 is a front view of the same as FIG. 1 with a part broken away.

FIGS. 4A and 4B show in schematic perspective views a main portion of another embodiment of the apparatus according to the invention in different operating states.

FIGS. 5A and 5B show in schematic perspective views a main portion of another embodiment of the apparatus according to the invention in different operating positions.

FIGS. 6A and 6B are views similar to FIGS. 5A and 5B and show still another embodiment of the apparatus according to the invention.

FIG. 7A shows in a partially sectioned elevational view a still further embodiment of the present invention.

FIG. 7B is a sectional view taken along the line VIIB—VIIB in FIG. 7A.

DETAILED DESCRIPTION OF PREFERRED EMBODIMENTS

Figure 8A:
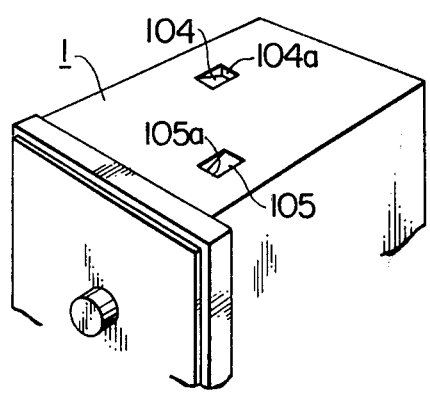
FIGS. 8A, 8B and 8C illustrate another embodiment of the apparatus according to the invention.

Now, the invention will be described with reference to the drawings.

Referring to FIGS. 1 to 3 which show a first embodiment of the electrical assembly unit mounting apparatus according to the invention, reference numeral 1 designates a main body or housing of an electrical assembly unit in which electric components as required are accommodated. The electrical device unit 1 is shown as having a flange 11, an adjusting knob 12 at the front portion and connection terminal pins 13 at the rear portion. It is, however, to be appreciated that these members 11, 12 and 13 do not constitute the essential part of the invention. Any other types of electrical units may be detachably mounted according to the invention. A panel P on which the electrical unit 1 is to be mounted is formed with a window $P_1$ through which a mounting or supporting frame 2 is adapted to be inserted from the front or left side as viewed in FIGS. 1 and 2 and secured to the supporting panel P, defining therein a cavity 21. In the described embodiment, the mounting frame 2 is shown as provided with a plug-in socket 3 disposed at a rear wall 22 in such a position that receptacles formed in the front portion of the socket 3 may receive the associated terminal pins 13 of the electrical assembly unit 1 when the latter is inserted into the cavity 21 defined by the mounting enclosure 2. Formed in one of the walls (bottom wall 23 in the illustrated embodiment) constituting the mounting frame or enclosure 2 is an elongated window or opening 24 in which a manipulating threaded rod or screw 4 is disposed and rotatably but axially unmovably, supported by bearing holes 23a and 23b formed in the bottom wall 23. The manipulating screw 4 has a head 4a which projects outwardly from the front portion of the mounting frame 2 and is formed with a groove or the like for receiving a tip of a manipulating tool such as a screw driver. A nut or pressing member 5 is threadedly mounted relatively tightly on the screw rod 4 so that the members 5 will be rotated for a predetermined angle when the screw 4 is rotated. It is noted that the nut 5 is formed with a pair of wing-like projections 51 and 52 projecting laterally from the nut 5 substantially in an alignment to each other. As can be seen from FIG. 3, when the screw 4 is rotated, either one of the lateral projections 51 or 52 will bear on the inner surface of the bottom wall 23 of the mounting frame 2 in dependence on the rotating direction of the screw 4. In other words, the angular distance for which the nut 5 is allowed to rotate in following the rotation of the screw 4 is limited by the projections 51 and 52 bearing on the inner surface of the bottom wall 23. Upon further rotation of the screw 4 which serves then as a lead screw, the nut 5 having the lateral projections 51 and 52 is moved along the longitudinal axis of the screw 4 either to the left or the right as viewed in FIGS. 1 and 2 in dependence upon the rotating direction of the screw 4. A pair of stops 14 and 15 projecting downwardly from the bottom surface of the electrical assembly unit 1 to be mounted in the enclosure 2 are disposed in such lateral position that the rear end surface of the stop 15 will face in opposition to the wing-like projection 52 when the electrical assembling unit 1 is removed from the enclosure 2 while the front end surface of the stop 14 will face toward the projection 51 when the electrical assembly unit 1 is mounted in the enclosure 2 (refer to FIGS. 1 and 3). It is further to be noted that the stops 14 and 15 are spaced longitudinally from each other for a distance $L_2$ which is selected slightly greater than the width $L_1$ of the projections 51 and 52 (refer to FIG. 1). Further, it should be noted that the thickness of the lateral projections 51 and 52 at least at the portions confronting the stops 14 and 15 or alternatively the thickness of the latter is so dimensioned that the unit 1 may be freely inserted or withdrawn without being interfered by the stops 14 or 15.

A through-hole 11a is formed in the flange 11 of the electrical unit body 1, so that the head 4a of the manipulating screw 4 can extend freely therethrough.

Next, description will be made on the mounting and the detachment operations of the mounting apparatus having the structure described above. When the electrical assembly unit 1 is to be mounted on the panel P, the unit 1 is inserted into the cavity 21 defined in the mounting enclosure 2 which has been previously secured to the panel P. At this time, the head 4a of the screw 4 cooperates with the through-hole 11a formed in the flange 11 to position the unit 1 in place for allowing the terminal pins 13 to be received in the associated receptacles of the socket 3. Thereafter, the manipulation screw 4 is rotated in the counter-clockwise direction by means of a suitable tool such as a screw driver, as indicated by arrow a2 in FIG. 3. The rotation of the screw 4 is accompanied with the rotation of the nut 5 which is however prevented from the further rotation when the lateral projection 52 bears on the inner surface of the bottom wall 23 of the mounting enclosure 2. Accordingly, further rotation of the screw 4 in the counter-clockwise direction will cause the nut 5 to be moved rearwardly or to the right (arrow b1) as viewed in FIG. 1 along the longitudinal axis of the screw with the projection 52 remaining slidably in contact with the inner surface of the bottom wall 23 of the enclosure or frame 2 without being obstructed by the stop 15 in the movement. The other lateral projection 51 of the nut 5 moves rearwardly to press forcefully against the front surface of the stop 14 formed in the lower surface of the unit 1. In this manner, the electrical unit 1 is inserted into and mounted fixedly in the enclosure frame 2 which is secured to the mounting panel P.

When the electrical unit 1 is to be detached or removed from the mounting frame 2, the manipulating screw 4 is rotated in the clockwise direction, as indicated by arrow a1. The lateral projection 51 will then be rotated together with the screw 4 until the projection 51 bears against the inner surface of the bottom wall 23 of the mounting enclosure 2, resulting in the disengagement of the lateral projection 51 of the nut 5 from the stop 14. When the screw 4 is further continued to be rotated in the clockwise direction, the wing-like projection 52 will come to engage the stop 15 at the rear side surface thereof, thereby to displace slidably the electrical unit 1 outwardly from the enclosure 2, as indicated by arrow b2 in FIG. 1. When the unit 1 is outwardly moved sufficiently for the terminal pins 13 to disengage from the socket 3, the electrical device unit 1 may be manually easily withdrawn from the mounting frame 2.

When the electrical device unit 1 is inserted into the cavity 21 of the enclosure 2, there may arise a danger that the wing-like projection 51 or 52 should forcefully impact on the stops 14 or 15 to injure them, depending on the location of nut 5 at the time of insertion.

To avoid such a disadvantage, there is proposed, according to another aspect of the invention, a stop arrangement such as shown in FIGS. 4A and 4B. As can be seen from these figures, the stop 14 provided on the electrical assembly unit 1 is formed with a bevelled surface 14a slanted rearwardly to the level of the surface of the unit 1 on which the stop 14 is disposed. Further, a semicylindrical guide projection 16 is additionally provided behind stop 15 substantially in longitudinal and transversal alignment with the stop 15 and 14, respectively. With such arrangement, the insertion of the unit 1 into the cavity 21 of the mounting frame 2 can be safely effected, since the wing-like lateral projection 51 or 52 of the nut 5 can be smoothly guided by the slanted surface 14a of the stop 14 or the curved surface of the semicylindrical guide 16.

FIGS. 5 to 8 show other embodiments of the invention. In the case of the embodiment shown in FIGS. 5A and 5B, the nut 5 threadedly mounted on the lead screw 4 is provided with a pair of lateral projections 501 and 502 which are axially spaced from each other for a predetermined distance and angularly positioned perpendicularly to each other. A single stop 101 is provided on the outer surface of the electrical assembly unit 1, which stop is so located as to be positioned between the projections 501 and 502. When the electrical device unit 1 is to be mounted, the projection 501 will engage the front edge of the stop 101 to press it so as to fixedly position the unit 1 in place within the cavity 21 of the mounting frame 2. Upon the detachment of the unit 1 from the enclosure 2, the projection 502 will press the rear edge of the single stop 101 thereby to displace the unit 1 outwardly from the enclosure 2.

In the embodiment shown in FIGS. 6A and 6B, the nut 5 is formed with only one lateral projection 503 which is adapted to rotate for 180° in the counter-clockwise or clockwise direction through the rotation of the lead screw 4 in the corresponding direction thereby to bear against the front edge of a first stop 102 or alternatively the rear edge of a second stop 103 provided on the unit 1 for moving the latter inwardly to the mounted position in the enclosure 2 or alternatively outwardly therefrom.

According to still another embodiment of the invention, the manipulating rod 4 is formed with a thread only at the rear end portion which is threadedly screwed into a threaded hole formed in the bottom wall 23 of the mounting enclosure 2 at a position corresponding to the bearing hole 23a shown in FIG. 1. Accordingly, the rotation of the manipulating screw 4 in either direction will bring about the axial or longitudinal displacement thereof in the corresponding direction. A pressing block 5 is mounted on the screw rod 4 at the non-threaded portion thereof so as to be axially unmovable relative to the manipulating rod 4 by a suitable means such as a resilient piece 6 which allows the rotation of the block 5 about the rod 4 under a certain force, as shown in FIG. 7B. The stop means of the embodiment may be constructed in a similar manner to the case of the embodiment shown in FIG. 1 or FIG. 4. In this embodiment, the manipulating rod 4 itself is moved in the axial direction carrying the pressing block 5 with either one of the lateral projections 51 or 52 bearing against the associated stop 15 or 14, while the other projection slidably contacts the inner surface of the bottom plate 23 of the mounting frame 2 in the manner described hereinbefore in conjunction with the embodiment shown in FIG. 1.

Figure 8B:
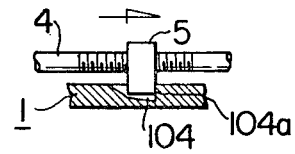
Figure 8C:
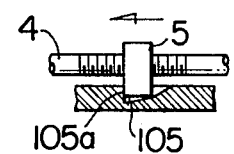

According to a further embodiment shown in FIGS. 8A, 8B and 8C, recesses 104 and 105 are formed in the outer housing of the electrical assembly unit 1 in place of the projecting stops of the preceding embodiments. As can be seen particularly from FIGS. 8B and 8C, when the unit 1 is to be mounted, the pressing projection of the nut 5 will press on the vertical stop face 104a of the recess 104 to move the unit to the mounted position, while the other projection of the nut 5 will press against the vertical stop face 105a of the recess 105 upon the detachment of the unit 1. The projections of the nut 5 adapted to engage with the recesses 104 and 105 may be of any suitable configuration.

Figure 9:
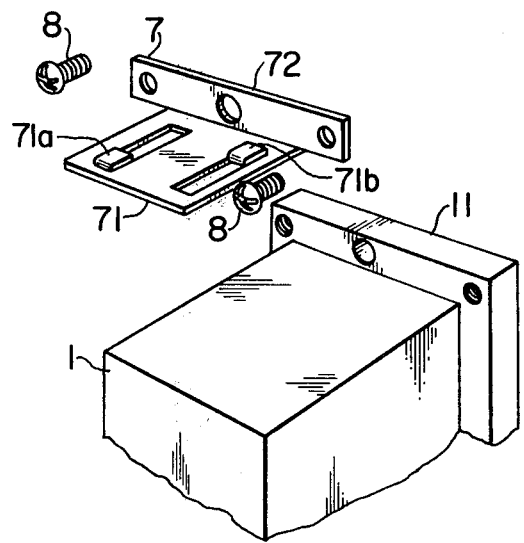
FIG. 9 is a perspective view showing an auxiliary structure which may be provided on the electrical assembly unit.

In the embodiments described above, the stops in the form of either projection or recess are formed integrally with the electrical device unit 1. However, it is equally possible to form the stop means independently from the unit 1. An example of such an arrangement is shown in FIG. 9. It can be seen that an angle member of L-like cross section is provided having a horizontal flat piece 71 in which a pair of stop projections 71a and 71b are formed. This stop member is adapted to be secured to the flange 11 at the rear side surface with the aid of a vertical leg portion 7 through set screws 8. The stop projections 71a and 71b can of course serve for the same function as that of the stops 14 and 15 of the hereinbefore described embodiments.

In another embodiment (not shown), it is possible to impart constantly a rotational torque of a predetermined direction to the manipulating screw 4 through a suitable means such as a spiral spring so that the pressing nut or block 5 may take always a predetermined angular position when the unit body 1 is removed from the mounting frame or enclosure 2. With such an arrangement, the insertion of the unit body 1 into the mounting frame 2 can be effected smoothly by preventing the stops or the like portions of the unit 1 from being impacted by the pressing member 5.

As will be appreciated from the foregoing description, the mounting apparatus according to the invention will permit a much simplified mounting and detachment of various electrical device units to the frame or enclosure 2 and hence to the panel P in a reliable manner by merely operating correspondingly a single manipulator screw or rod 4 without impairing the esthetic appearance of the whole apparatus. Additionally, the head 4a of the screw or rod 4 can serve also as an indexing means to assure a facilitated mounting of electrical units. Further, since the electrical unit to be mounted is provided with no other means than the stops or recesses, the overall esthetic appearance can be retained and the unit thus may be mounted at any other portion or directly to the panel without using the mounting frame.

In the foregoing, preferred embodiments of the invention have been shown and described. It should, however, be appreciated that the invention is never restricted to these embodiments and many modifications and variations will occur to those skilled in the art without departing from the scope of the invention.

We claim:

1. An apparatus for detachably mounting an electrical assembly unit to a panel, comprising:
    a supporting frame adapted to be attached to said panel prior to the mounting of the electrical assembly unit;
    a manipulating rod provided rotatably in said supporting frame and extending in the direction along which said unit is mounted or removed;
    pressing means mounted on said manipulating rod and movable both axially of said rod and relative to said electrical assembly unit upon rotation of said rod; and
    engaging means fixedly provided on said electrical assembly unit in a position to be engaged by said pressing means,
    said manipulating rod being so arranged that the rotation thereof causes movement of said pressing means to bear pressingly against said engaging means whereby said electrical assembly unit is forcefully moved either to a mounted or clamped position or to a detached position in dependence upon the direction of rotation of said rod.

2. An apparatus as set forth in claim 1, wherein said rod is composed of a rotatably supported lead screw and said pressing means includes a nut portion threadedly mounted on said screw and at least one projecting portion laterally extending from said nut portion and being adapted to engage with said engaging means.

3. An apparatus for detachably mounting an electrical assembly unit to a panel, comprising:
    a supporting frame adapted to be attached to said panel prior to the mounting of the electrical assembly unit;

a manipulating rod provided rotatably in said supporting frame and extending in the direction along which said unit is mounted or removed;

pressing means mounted on said manipulating rod movably axially of said rod upon rotation thereof; and engaging means fixedly provided on said electrical assembly unit in a position to be engaged by said pressing means, said manipulating rod being so arranged that the rotation thereof causes movement of said pressing means to bear pressingly against said engaging means, whereby said electrical assembly unit is forcefully moved either to a mounted or clamped position or to a detached position in dependence upon the direction of rotation of said rod, said rod having a head which projects outwardly from said supporting frame, said head serving as a means for receiving a manipulating tool for rotating said rod and at the same time as an indexing means in cooperation with a hole formed in said electrical assembling unit to facilitate the positioning of said unit when said unit is to be mounted.

4. An apparatus for detachably mounting an electrical assembly unit to a panel, comprising:

a supporting frame adapted to be attached to said panel prior to the mounting of the electrical assembly unit;

a manipulating lead screw provided rotatably in said supporting frame and extending in the direction along which said unit is mounted or removed;

pressing means including a nut portion threadedly mounted on said manipulating lead screw movably axially of said lead screw upon rotation thereof and at least one projecting portion laterally extending from said nut portion;

engaging means fixedly provided on said electrical assembly unit in a position to be engaged by said projecting portion of said pressing means;

said nut portion being threadedly mounted on said lead screw so tightly that said nut is enabled to rotate together with said lead screw to such an angular position that said projecting portion is adapted to bear against said engaging means; and said manipulating lead screw being so arranged that the rotation thereof causes movement of said projecting portion of said pressing means to bear pressingly against said engaging means, whereby said electrical assembly nut is forcefully moved either to a mounted or clamped position or to a detached position in dependence upon the direction of rotation of said lead screw.

5. An apparatus as set forth in claim 4, wherein said pressing means includes a pair of projecting portions laterally extending from said nut portion and said engaging means is composed of a pair of stops spaced from each other laterally and axially of said lead screw so that one of said projecting portions is adapted to press one of said stops in correspondence with one rotational direction of said lead screw, while the other projecting portion is adapted to press the other stop in correspondence with the other rotational direction of said lead screw.

6. An apparatus as set forth in claim 5, wherein guide means having a bevelled surface at the rear portion thereof is provided on said electrical assembly unit for facilitating a smooth insertion of said unit into a mounting space of said mounting frame.

7. An apparatus as set forth in claim 4, wherein said pressing means includes a pair of projecting portions which extend laterally from said nut portion and which are angularly positioned substantially perpendicularly to each other and spaced axially for a predetermined distance from each other, and said engaging means is composed of a single stop which is adapted to be located between said pair of projecting portions of said pressing means when said electrical assembly unit is to be mounted or removed, said pair of projecting portions being adapted to alternatively engage with said stop for rotation of said lead screw about 90°.

8. An apparatus as set forth in claim 4, wherein said pressing means includes a single projecting portion extending laterally from said nut portion, and said engaging means is composed of a pair of stops spaced from each other laterally and axially of said lead screw in such position that said stops are adapted to be alternatively engaged by said projecting portion for the rotation of said lead screw about 180°.

9. An apparatus as set forth in claim 4, wherein said engaging means is composed of at least one projection integrally formed with said electrical assembly unit so as to serve as a stop for said projecting portion of said pressing means.

10. An apparatus as set forth in claim 4, wherein said engaging means is composed of at least one recess integrally formed with said electrical assembly unit so as to serve as a stop for said projecting portion of said pressing means.

11. An apparatus as set forth in claim 4, wherein said engaging means is provided independently of said electrical assembly unit and adapted to be secured to said unit when said unit is to be detachably mounted on said supporting frame.

12. An apparatus for detachably mounting an electrical assembly unit to a panel, comprising:

a supporting frame adapted to be attached to said panel prior to the mounting of said electrical assembly unit;

a partly outer threaded manipulating rod mounted threadedly in said supporting frame so as to be axially displaced upon rotation thereof in the direction along which said electrical assembly unit is mounted or removed;

pressing means mounted on said manipulating rod axially unmovably relative to said rod;

engaging means fixedly provided on said electrical assembly unit in a position to be engaged by said pressing means; and said manipulating rod being so arranged that the rotation and therefore the displacement thereof causes movement of said pressing means to bear pressingly against said engaging means, whereby said electrical assembly unit is forcefully moved either to a mounted or clamped position or to a detached position in dependence upon the direction of rotation of said rod.

* * * * *